US010616807B2

(12) United States Patent
Gunyel et al.

(10) Patent No.: US 10,616,807 B2
(45) Date of Patent: Apr. 7, 2020

(54) SYSTEM AND METHOD FOR GENERATING CS FALLBACK ANALYTICS IN 4G NETWORKS (71) Applicant: ARGELA YAZILIM VE BILISIM TEKNOLOJILERI SAN. VE TIC. A.S., Istanbul (TR)

(72) Inventors: Mahir Gunyel, Istanbul (TR); Ismail Bayraktar, Istanbul (TR); Selim Soyut, Istanbul (TR); Emre Yakin, Istanbul (TR); Baris Yilmaz, Istanbul (TR)

(73) Assignee: Argela Yazilim ve Bilisim Teknolojileri San ve Tic A.S., Istanbul (TR)

( * ) Notice: Subject to any disclaimer, the term of this patent is extended or adjusted under 35 U.S.C. 154(b) by 211 days.

(21) Appl. No.: 15/653,518

(22) Filed: Jul. 18, 2017

(65) Prior Publication Data
US 2019/0028932 A1    Jan. 24, 2019

(51) Int. Cl.
*H04W 36/00* (2009.01)
*H04W 24/08* (2009.01)

(52) U.S. Cl.
CPC ....... *H04W 36/0022* (2013.01); *H04W 24/08* (2013.01); *H04W 36/0083* (2013.01)

(58) Field of Classification Search
CPC .................. H04W 36/0022; H04W 24/08
See application file for complete search history.

(56) References Cited

U.S. PATENT DOCUMENTS

| 6,785,237 | B1 * | 8/2004 | Sufleta | H04L 43/12 370/236 |
| 9,301,213 | B1 | 3/2016 | Bovo et al. | |
| 2005/0043036 | A1 * | 2/2005 | Ioppe | H04W 4/029 455/456.1 |
| 2015/0289160 | A1 * | 10/2015 | Wellington | H04W 28/08 370/235 |
| 2016/0080982 | A1 * | 3/2016 | Bovo | H04L 41/5009 370/252 |
| 2017/0265116 | A1 * | 9/2017 | McCann | H04W 36/22 |
| 2019/0026675 | A1 * | 1/2019 | McKibbin | G06Q 10/06393 |

* cited by examiner

*Primary Examiner* — Zhiren Qin
(74) *Attorney, Agent, or Firm* — IP Authority, LLC; Ramraj Soundararajan (57) ABSTRACT

Key processing times (such as call setup delay, call failure rate, call success rate, etc.) and other relevant metrics are measured in their respective networks (i.e., in LTE or 3G/2G networks) from raw signaling by various time-synchronized probes in real-time. Raw signaling data are collected from such probes in run-time, and various KPIs such as the end-to-end call setup times, success rates or causes of failure from call initiation in the LTE network to call completion in a 2G/3G network by correlating various raw signaling data collected by the probes in real-time.

15 Claims, 6 Drawing Sheets

| | record | record | record | record | record | record | record | record |
|---|---|---|---|---|---|---|---|---|
| DR1 | Call Request | IMSI | eNodeB-Id | MME-Id | Start Time | End Time | | Result |
| DR2 | Call Request | IMSI | RNC-Id | MSC-Id | Start Time | End Time | Ring Time | Answer Time | Result |
| | | | | | | | | |

SYSTEM AND METHOD FOR GENERATING CS FALLBACK ANALYTICS IN 4G NETWORKS

BACKGROUND OF THE INVENTION

Field of Invention

The present invention relates to a monitoring system and method for determining the voice call analytics when mobile originating or terminating calls in 5G/LTE networks are routed through a 3G/2G circuit switched core network for voice service.

Nomenclature

CS—Circuit Switched
CSFB—Circuit Switched Fallback
DR—Data Record
EPC—Enhanced Packet Core
HSS—Home Subscriber Service
IMS—IP Multimedia System
IMSI—International Mobile Subscriber Identity
JMS—Java Messaging Service
LTE—Long Term Evolution
MME—Mobility Management Entity
MO—Mobile Originating
MSC—Mobile Switching Center
MT—Mobile Terminating
NAS—Non-Access Stratum
SGSN—Serving General Packet Service Node
SGW—Signaling Gateway
SMS—Short Messaging Service
UE—User Equipment
UT—User Terminal
VLR—Visited Location Registrar
VoIP—Voice over IP

Discussion of Related Art

Any discussion of the prior art throughout the specification should in no way be considered as an admission that such prior art is widely known or forms part of common general knowledge in the field.

Evolved Packet Core (EPC), the core network of the next-generation mobile communications, can accommodate multiple radio access systems like 3G, Long Term Evolution (LTE), and wireless LAN in an integrated manner and can provide mobility management seamlessly across these multiple technologies. Here, LTE provides all services including the voice and SMS services using Internet Protocol (IP) only (i.e., packetized) meaning without providing the existing Circuit Switched (CS) domain functions. Accordingly, Voice over IP (VoIP) will replace the voice service that has traditionally been provided over the CS domain. This will eventually require the deployment of the IP Multimedia Subsystem (IMS) within the LTE domain, which is clearly specified by standards. However, at the initial phase of the LTE deployment, it may take some time before IMS and VoIP services can be provided due to the size of the target coverage area, the time required for facility planning, etc. As a consequence, a scenario in which voice services are provided in a step-by-step approach has been discussed at 3GPP. Yet, a mobile terminal capable of LTE cannot utilize the 3G radio access system simultaneously while camping on LTE and, as a result, it would have no means of receiving a mobile terminating call from the 3G CS domain. Thus, for the time that IMS is not provided on LTE, the terminal would not be able to originate or terminate any voice calls at all.

There can be a couple of options to complete a voice call in LTE: One option is just to use VoIP. Second option is to use multiple networks. Consider multi-technology user terminals (UE) that support combined registration procedures to both LTE and 3G networks. For example, if the UE wants to have a packet communications, the network redirects it to the normal LTE packet core network, but if the UE wants to have a voice call then the network redirects the call to one of the existing networks that supports circuit switched voice. This function, called "CS Fallback (CSFB)," specified in 3GPP standards, enables voice services using existing 3G/2G-CS domain functions to be provided to users even if VoIP services are not being directly provided over LTE.

Although it may sound simple and useful, it is not that simple because the LTE network and 3G's circuit switched core network must interconnect and operate in synchronicity. A linkage is needed between the LTE and 3G networks to make CSFB work. In this case, the key linkage is between the MSC/VLR in the circuit switched core network and the MME in the LTE core network, and the interface connecting these two entities is called 'SGs' reference point which is defined by 3GPP standards. The CSFB function uses the SGs reference point to transfer the MT call requests from the CS domain to LTE. It also provides a combined mobility management capability between the 3G CS and LTE domains.

To complete a call using the CSFB function, the CS domain needs to know which LTE location registration area the mobile user terminal is currently camping on. To this end, the MME must correlate mobility management control of the CS domain with that of LTE and inform MSC/VLR that the mobile terminal is present in a specific LTE location registration area. This concept of combined mobility management is appropriated by the CSFB function. Specifically, MSC/VLR uses the same logic for receiving a location registration request from SGSN as that for receiving a location registration request from MME. This achieves a more efficient combined mobility management between the CS domain and EPC while reducing the development impact on MSC.

A mobile terminal using LTE cannot use 3G at the same time. This implies that the MME, which contains the LTE location registration area (known as the Tracking Area (TA)), is unable to identify which MSC/VLR it should send the mobility management messages to/from the TA alone. To solve this problem, the mapping of TAs and 3G Location Areas (LA) within MME has been adopted. The concept behind TA/LA mapping enables MME to know which MSC/VLR to interface with for a specific location of a user terminal.

For a MO call, the UE begins by sending a CSFB service request message to the MME. Since a packet-communications path must always exist in the EPC for the purpose of providing an always-on connection, the bearer also has to be handed over to 3G. To accomplish this, the MME issues a 'handover command' to the UE in LTE and initiates a handover procedure towards 3G. The UE changes its radio from LTE to 3G during this procedure. On completion of handover, the mobile terminal issues an originating request for voice service towards the MSC/VLR. A voice-call connection is then established using an existing call-originating procedure on 3G and the CSFB procedure is completed.

For the case of an MT call, the scenario is similar. When the MSC/VLR receives a message indicating the occurrence of a mobile terminating call, the MSC/VLR identifies the corresponding MME from the call information received. Then, the MSC/VLR sends a 'paging' message towards that MME. Next, the MME sends a 'paging' message to the mobile terminal in LTE. This paging message includes an indication that the call is a CS service, and on identifying the call as such, the mobile terminal sends a CSFB service request signal to the MME. Following this, a handover procedure to 3G takes place. The mobile terminal that is now switched to 3G sends a paging response message to the MSC/VLR at which it is registered. Finally, an existing mobile terminating call procedure on 3G is executed and the CSFB is completed. The call signaling sequence for MO, MT and M2M scenarios are all prior art and clearly defined by the standards.

Figure 1:
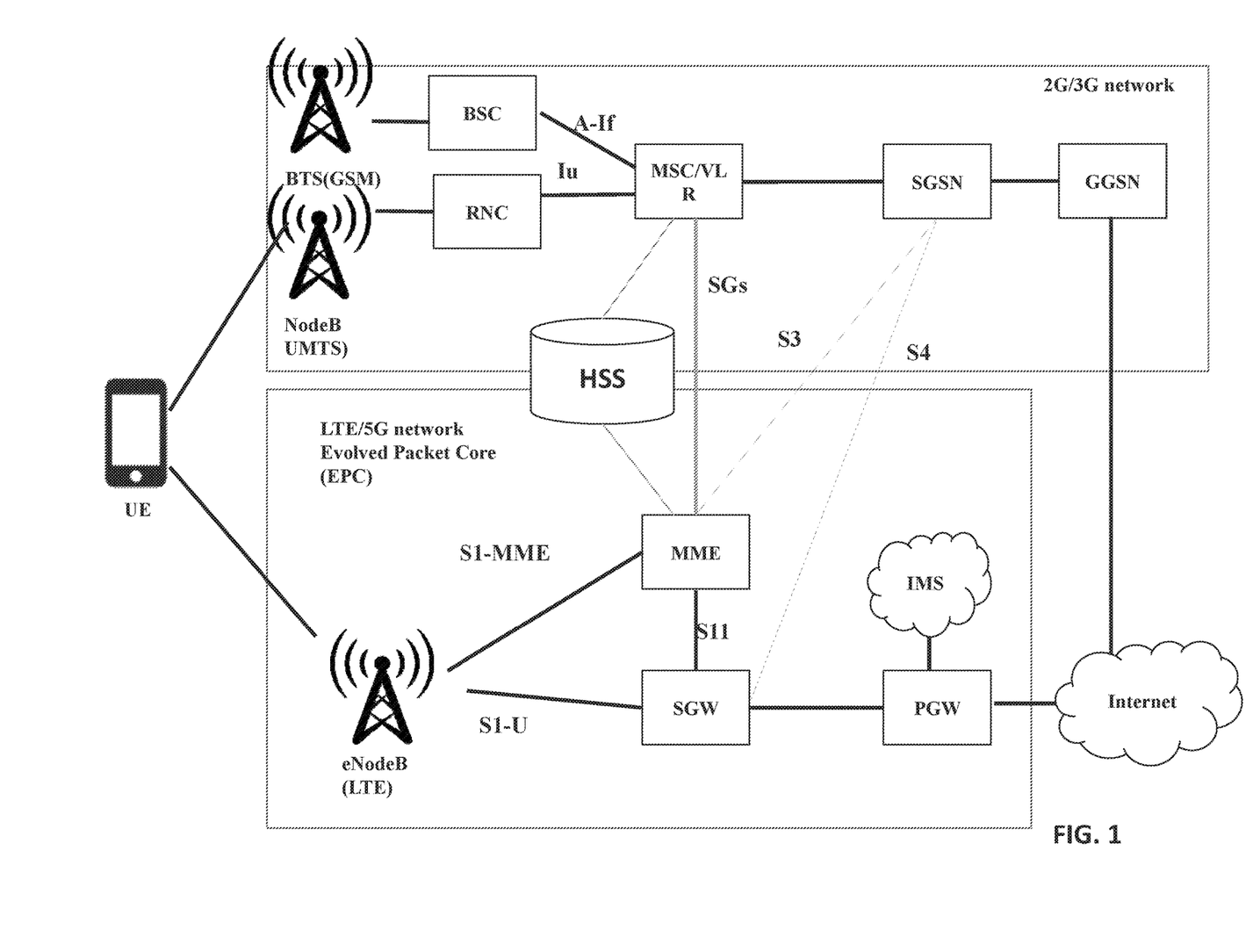
FIG. 1 is an exemplary 5G/LTE network with CSFB feature.

FIG. 1 illustrates an example LTE network alongside a 3G network for CSFB. The network components involved in call completion are illustrated. Note that the LTE network does not have an IMS capability to perform VoIP based call completion. Note also that the UE can attach to both networks, capable of switching its radio capabilities from LTE to 3G when there are originating (MO) or terminating (MT) voice calls. The interface between the MME and MSC/VLR is the SGs interface that plays a primary role to switch the call signaling from LTE to 3G. There are also other interfaces linking the two core networks: an S3 interface between the MME and SGSN, and an S4 interface between SGW and SGSN, both defined by the 3GPP standards.

Embodiments of the present invention are an improvement over prior art systems and methods.

SUMMARY OF THE INVENTION

A system and method is described for determining key performance indicators (KPI) of CS Fallback when voice calls are switched from LTE to 2G or 3G core network for call completion. The system attaches to probes in LTE, 2G and 3G networks to extract raw signaling data in run time, determines the total call setup time and several other important KPIs by correlating the two sets of data and reports KPIs.

In one embodiment, the present invention provides a system for determining Key Performance Indicators associated with a mobile voice call setup of an operator, the system attached to at least one probe in a Long-Term Evolution (LTE) network collecting raw signaling data associated with the voice call setup in the LTE network, the system attached to at least another probe in either a 2G or 3G network collecting raw signaling data associated with the voice call setup in the 2G or 3G network, the at least one another probe in the 2G or 3G network time-synchronized with the one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the system comprising: (a) a correlating subsystem to correlate the raw signaling data associated with the voice call setup in the LTE network and the raw signaling data associated with the voice call setup in the 2G or 3G network, and determining those data records that are associated with a voice call which is a CS FallBack (CSFB) call; (b) a calculating subsystem to calculate Key Performance Indicators associated with the CSFB call; (c) a storing subsystem to store in a database: (1) data records associated with the CSFB call correlated by the correlating subsystem, and (2) the calculated Key Performance Indicators calculated by the calculating subsystem; and (d) a reporting subsystem to report Key Performance Indicators of the CSFB call according to an operator-specified format.

In another embodiment, the present invention provides a method to determine the Key Performance Indicators associated with a mobile voice call setup of an operator using probes, at least one probe in a Long-Term Evolution (LTE) network collecting raw signaling data associated with the voice call setup in the LTE network, at least another probe in either a 2G or 3G network collecting raw signaling data associated with the voice call setup in the 2G or 3G network, the at least one another probe in the 2G or 3G network time-synchronized with the one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the method comprising: (a) correlating the raw signaling data associated with the voice call setup in the LTE network and the raw signaling data associated with the voice call setup in the 2G or 3G network, and determining those data records that are associated with a voice call that is a CS FallBack (CSFB) call; (b) determining when the voice call has succeeded/failed, wherein when the voice call has succeeded, calculating delay components contributed by each signaling delay component, and calculating a total call setup delay of the voice call, and wherein when the voice call has failed, determine a location of failure, and incrementing a call failure KPI; (c) determining when a user terminal returns to the LTE network after the voice call is complete, wherein when the user terminal has not returned to the LTE network after the voice call is complete, incrementing return to LTE failure KPI, and wherein when the user terminal has returned to the LTE network, incrementing return to LTE delay KPI.

In yet another embodiment, the present invention provides a method to determine the Key Performance Indicators associated with a mobile voice call setup of an operator using probes, at least one probe in a Long-Term Evolution (LTE) network collecting raw signaling data associated with the voice call setup in the LTE network, at least another probe in either a 2G or 3G network collecting raw signaling data associated with the voice call setup in the 2G or 3G network, the at least one another probe in the 2G or 3G network time-synchronized with the one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the method comprising: (a) correlating the raw signaling data associated with the voice call setup in the LTE network and the raw signaling data associated with the voice call setup in the 2G or 3G network, and determining those data records that are associated with a voice call which is a CS FallBack (CSFB) call; (b) calculating Key Performance Indicators associated with the CSFB call; (c) storing in a database: (1) data records associated with the CSFB call correlated in (a), and (2) the calculated Key Performance Indicators calculated in (b); and (d) a reporting subsystem to report Key Performance Indicators of the CSFB call according to an operator-specified format.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a gateway, switch, probe, or monitor) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Figure 2:
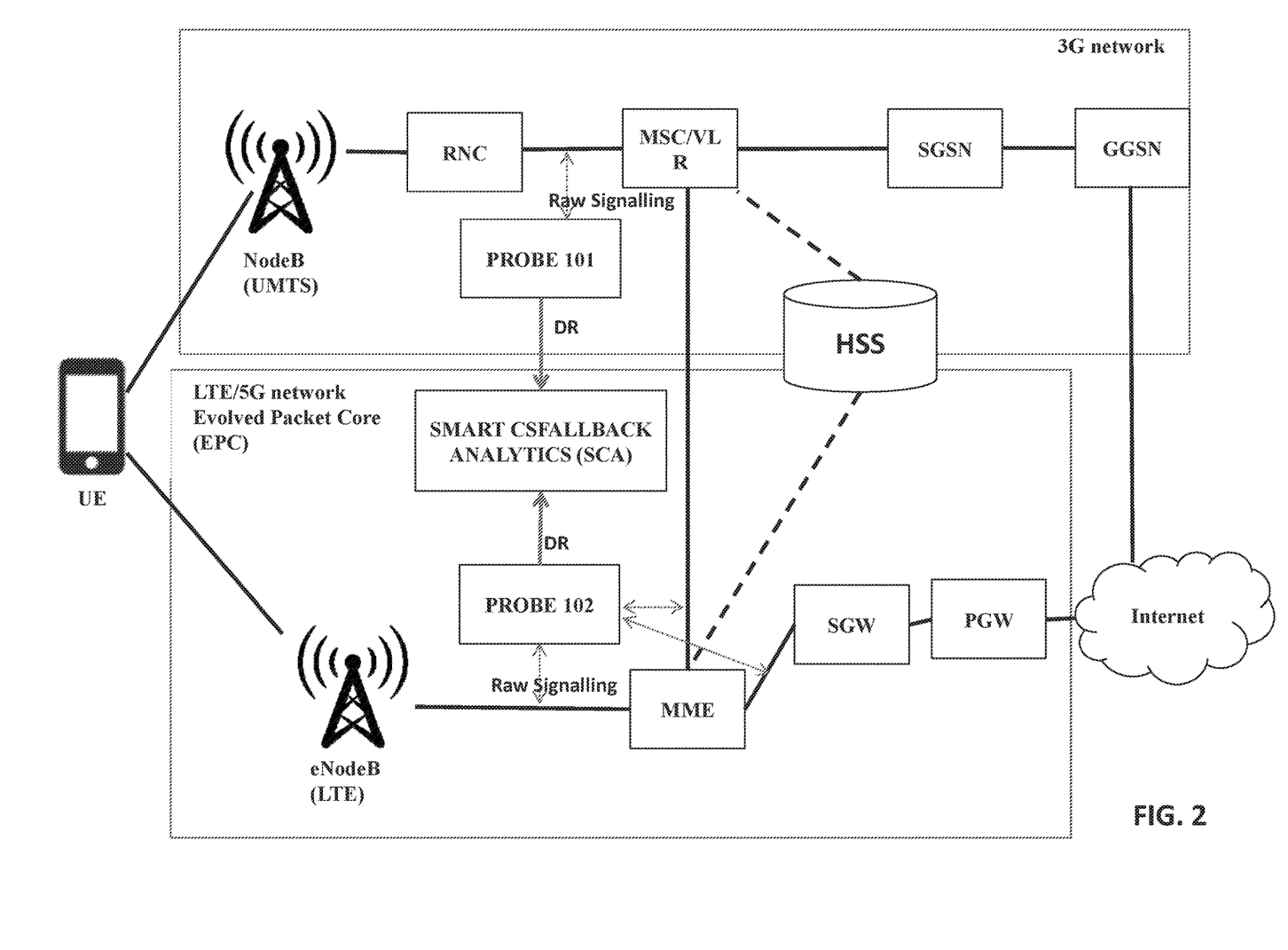
FIG. 2 is an exemplary network with the system of invention.

FIG. 2 illustrates the network diagram with LTE and 3G networks wherein the system of invention called Smart CSFB Analytics (SCA) is deployed. SCA is attached to (i) a Probe 102 in the LTE network which collects raw signaling data at the interface of the MME, (ii) a Probe 101 in the 3G/2G network which collects raw signaling data up to call completion at the interface of the MSC/VLR. A key aspect of these probes 101 and 102 is that they are time-synchronized according to methods well known in prior art, such as:

IEEE 1588-2008/PTPv2 time synchronization

Pulse-Per Second (PPS) time synchronization

GPS and CDMA time synchronization over PPS and Server Serial Port

Operating System (OS) time synchronization

The interface between SCA and these two Probes are typically run-time interfaces to receive data records (DRs) associated with each CSFB call signaling as soon as it is measured. Such an interface is Java Message Service (JMS) API. Other run-time interfaces as well as batch interfaces are feasible.

Figure 3A:
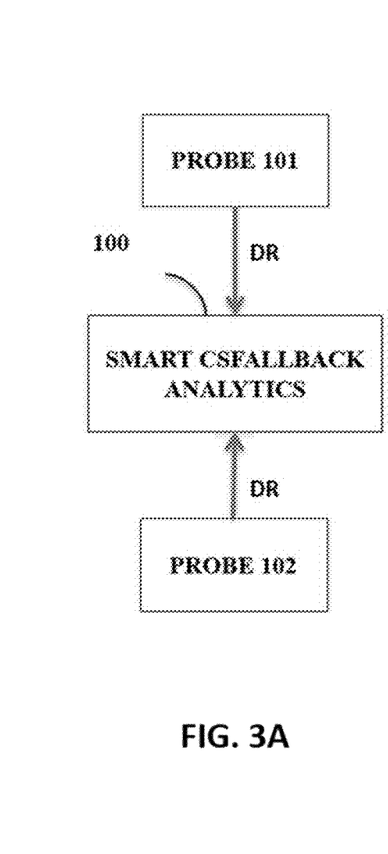
FIGS. 3A-3D show various implementations of the system of invention.
Figure 3B:
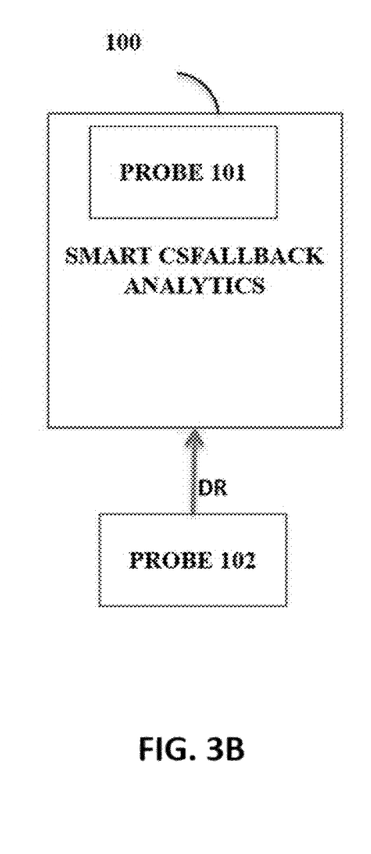
Figure 3C:
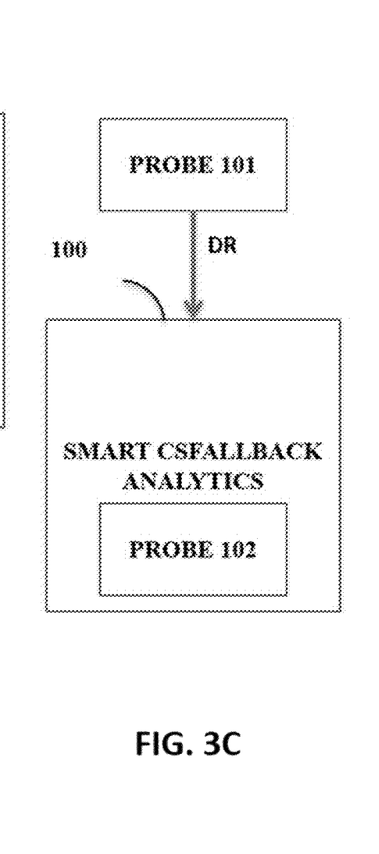
Figure 3D:
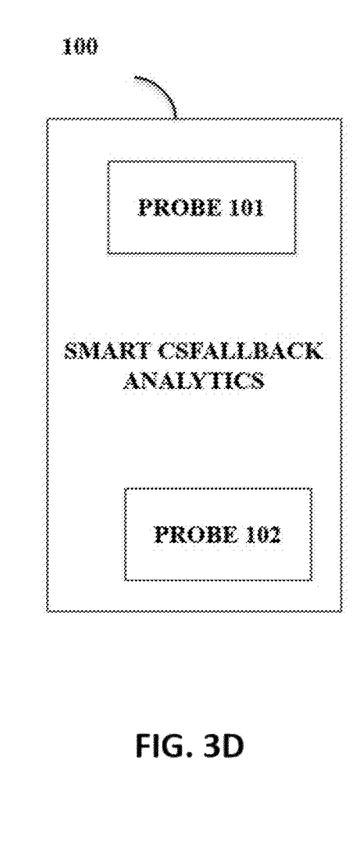

FIGS. 3A-3D illustrate various embodiments of SCA. While SCA can be a standalone system connected to Probe 101 and 102 with local/collocated (such as an Ethernet) or remote interfaces (such as a WAN), as illustrated in FIG. 3A, it can be an integrated system with Probe 101 or Probe 102, as illustrated in FIG. 3B and FIG. 3C respectively, or in another embodiment, it can be an all-in-one-box as illustrated in FIG. 3D.

Figure 4:
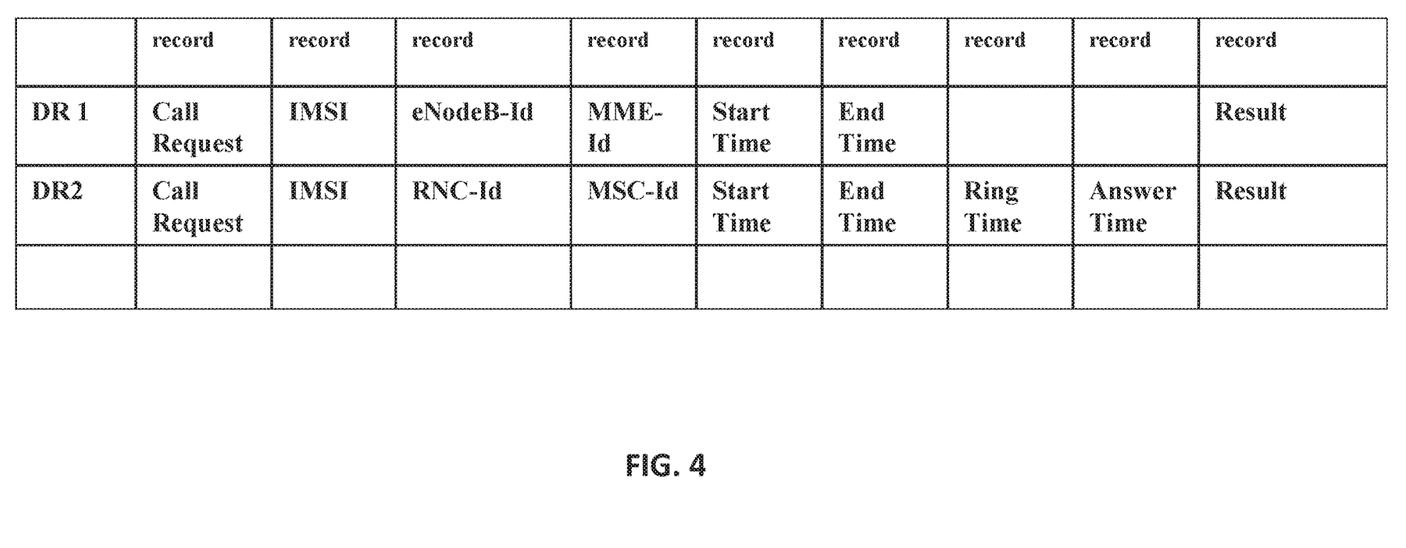
FIG. 4 is a table showing exemplary KPIs.

A list of exemplary KPIs for MO and MT calls is given in FIG. 4. These KPIs can be provided for different types of operator-defined reports. Examples are Operator-defined time-interval based (5 mins, 15 mins, 60 mins, 24 hours, weekly, monthly, and even small time intervals such as 5 secs);

MME based;

eNodeB based;

RNC/BSC based;

MSC/VLR based;

User Terminal type based;

Grouplist based, etc.

The total call setup time for MO and MT calls are contributed by several components. The first step in the signaling between the UE and MME, which is captured in FIG. 4 as the 'delay from LTE access'. Second, the EU changes radio from LTE to 3G, which is captured by 'delay from UE radio change'. Third, there is call signaling delay within the 3G network, which is captured by 'delay from 3G core'. For MT Call case, the fourth one is delay within SGs interface, which is captured by 'delay from SGs". These delays are calculated by using the information in different correlated interface Data Records (DR). The MO and MT total setup times are, therefore:

MO CSFB Total Setup Time=MO Delay from LTE access+MO Delay from UE radio change+MO Delay from 3G core  (1)

MT CSFB Total Setup Time=MT Delay from SGs+ MT Delay from LTE access+MT Delay from UE radio change+MT Delay from 3G core  (2)

MO CSCB Success Rates (%)=(100−number of failures for each 100 MO calls due to UE,S1 and A/Iu failures)  (3)

MTO CSCB Success Rates (%)=(100−number of failures for each 100 MT calls due to UE,S1 and A/Iu failures)  (4)

Key Data records (DRs) used to calculate the KPIs are collected as raw signaling as illustrated in FIG. 1. There are at least two data records per call that are correlated in order to calculate CSFB success rate and setup time KPIs:
DR-1 is collected from the LTE network
DR-2 is collected from the 2G/3G network Those data records that are associated with the same call are determined by using data fields in DR-1 and DR-2, such as start-time and end-time of the call, IMSI, procedure-type, CSFB indicator, call direction (MO or MT), etc. Simplified DR-1 and DR-2 are as follows:

| | record | record | record | record | record | record | record | record | record |
|---|---|---|---|---|---|---|---|---|---|
| DR1 | Call Request | IMSI | eNodeB-Id | MME-Id | Start Time | End Time | Call direction | | Result |
| DR2 | Call Request | IMSI | RNC-Id | MSC-Id | Start Time | End Time | Call direction | Ring Time | Result |

Some of the DR-1 and DR-2 fields and their definitions are provided in TABLE 1 and TABLE 2, respectively. The list is not exhaustive. Meaning, there are other DR fields that are not listed in these Tables that may also be available for processing. In case of MT call, for example, a DR-3 from SGs interface should also be correlated with DR-1 and DR-2 in order to calculate MT KPIs.

A fourth data record, DR-4 is the data record collected from LTE (S1-MME interface) for calculating the delay of re-attachment to LTE network again. This DR should be correlated to the existing ones in order to calculate the 'return to LTE KPI'.

TABLE 1

| | |
|---|---|
| IMSI | International Mobile Subscriber Identity: Unique ID of mobile subscriber. |
| GUTI | Globally Unique Temporary UE Identity: To identify a UE between the UE and the MME on behalf of IMSI for security reasons |
| MSISDN | Mobile Subscriber Identification Number: Assigned by operator. |
| MMEI | MME Identifier: To identify a MME uniquely within a PLMN Operator commissions at eNB. |
| IMEI | International Mobile Equipment Identity: To identify a ME (Mobile Equipment) uniquely. |
| ECGI | E-UTRAN Cell Global Identifier: To identify a Cell in global (Globally Unique) EPC can know UE location based of ECGI. |
| TAI | Tracking Area Identity: To identify globally unique Tracking Area |
| ENB-IP | IP Address of the eNode-B: the UE is attached to this eNodeB in the 3G network. |
| MME-IP | IP Address of the MME: the UE is attached to this MME in the LTE network |
| MCC | Mobile Country Code. |
| MNC | Mobile Network Code. |
| Start Time | Start time of the call. |
| End Time | End time of the call. |
| Procedure Duration | Duration of the procedure in msec. |

TABLE 2

| Parameter | Description |
|---|---|
| Source IP | Source IP in IP header |
| Dest IP | Destination IP in IP header |
| OPC | Originating Point Code |
| DPC | Destination Point Code |
| SLR | SCCP Source Local Reference |
| DLR | SCCP Destination Local Reference |

TABLE 2-continued

| Parameter | Description |
|---|---|
| Protocol | Radio Interface protocol |
| A Number | Calling Party Number in CC Setup message. It is available only in MT calls. |
| B Number | Called Party Number in CC Setup message. It is available only in MO calls. |
| Direction | Defines if the call is MO or MT. If called number exists in SETUP message then it is marked as MO, else it is marked as MT. |

TABLE 2-continued

| Parameter | Description |
|---|---|
| Alert Duration | Duration between CM Service Request/Paging and CC Alerting or Connect message in case there is no CC Alerting messages. |
| Conversation Duration | Duration between the CC Connect Ack message and CC Disconnect (call release message other than Disconnect in case there is no Disconnect message) message |
| Setup Duration | Duration between CM Service Request and the CC Setup message for MO calls, and the duration between Paging and the CC Setup message for MT calls. If the Setup message is not received, this field will be 0. For multiple setup situations, this field will be calculated only for the first Setup message, the others will be ignored and reported as 0. |
| Call Connected | Whether the call is answered. CC Connect Ack message has to be received. |

Figure 5:
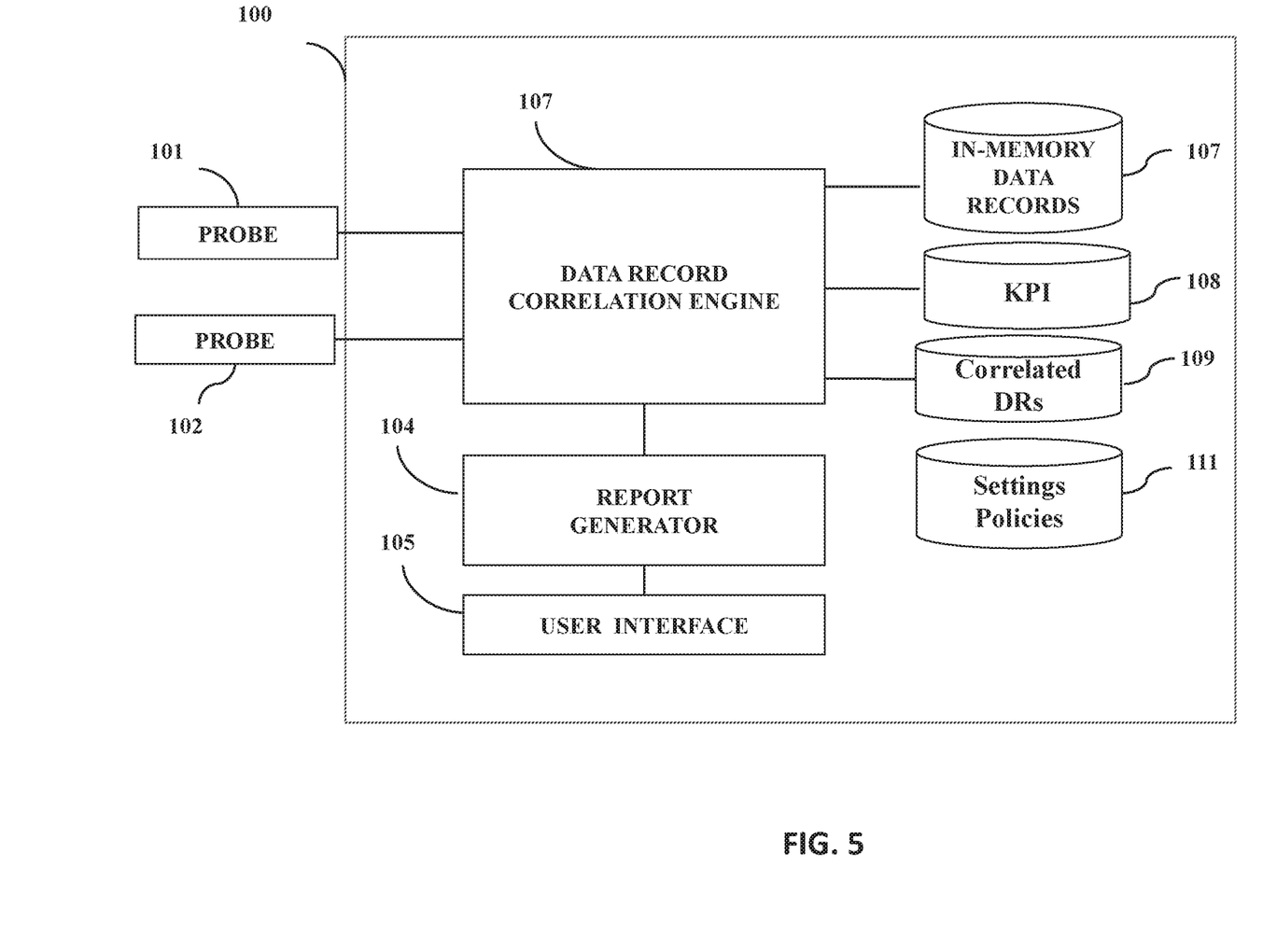
FIG. 5 illustrates the high-level block diagram of the system of invention.

A bock diagram of an exemplary system is illustrated in FIG. 5. The system has interfaces to Probe 101 and 102. The settings and policies are stored in Database 111. The in-memory database 107 stores the DRs collected from probes 101 and 102. The unified DRs that are correlated are stored in database 109. The determined KPIs are stored in database 108. The heart of the system is the Correlation Engine 100, which receives the data records, correlates them and generates KPIs. Report generation 104 generates reports for the operator. The user interface is for the operator to tune the settings, policies and display of KPIs.

Figure 6:
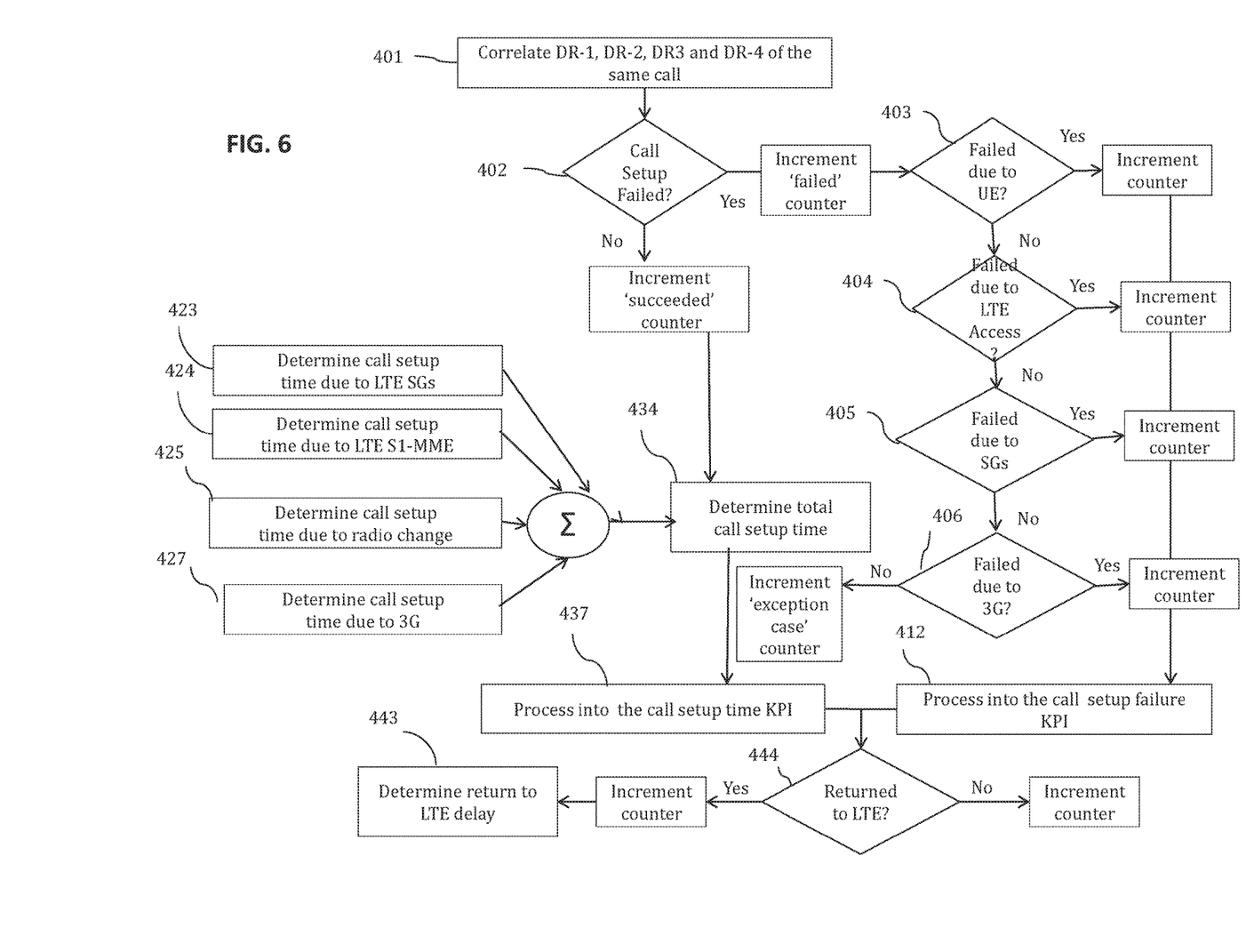
FIG. 6 illustrates a flow chart of the method of invention.

A simplified flowchart illustrating the process of KPI updating with a new CSFB call is shown in FIG. 6. The process starts at step 401 when Data Record Correlation Engine 100 of FIG. 5 correlates data records of a CSFB call and starts the process of updating the KPIs by adding the information on the new CSFB call. The system checks to determine if the call setup succeeded or failed in check-box 402. If the call setup failed, in steps 403 through 406, it determines where the failure occurred and increments the associated counter. Thereafter, in step 412, it adds the new data to the KPI. Different KPIs may be associated with a time-period, MME, eNodeB, grouplist, IMSI etc. and stored in DB 108. If the call setup succeeded, in steps 423 through 427, each individual call setup time component is incremented, the total call set up time is calculated in step 434, and the associated call setup time KPI is updated in step 437. Then in step 444, it is checked if a correlated DR is found for return to LTE. If not, then it increments the failure KPI, else it increments the success KPI and the duration KPI.

In one embodiment, the present invention provides a system for determining Key Performance Indicators associated with a mobile voice call setup of an operator, the system attached to at least one probe in a Long-Term Evolution (LTE) network collecting raw signaling data associated with the voice call setup in the LTE network, the system attached to at least another probe in either a 2G or 3G network collecting raw signaling data associated with the voice call setup in the 2G or 3G network, the at least one another probe in the 2G or 3G network time-synchronized with the one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the system comprising: (a) a correlating subsystem to correlate the raw signaling data associated with the voice call setup in the LTE network and the raw signaling data associated with the voice call setup in the 2G or 3G network, and determining those data records that are associated with a voice call which is a CS FallBack (CSFB) call; (b) a calculating subsystem to calculate Key Performance Indicators associated with the CSFB call; (c) a storing subsystem to store in a database: (1) data records associated with the CSFB call correlated by the correlating subsystem, and (2) the calculated Key Performance Indicators calculated by the calculating subsystem; and (d) a reporting subsystem to report Key Performance Indicators of the CSFB call according to an operator-specified format.

In another embodiment, the present invention provides a method to determine the Key Performance Indicators associated with a mobile voice call setup of an operator using probes, at least one probe in a Long-Term Evolution (LTE) network collecting raw signaling data associated with the voice call setup in the LTE network, at least another probe in either a 2G or 3G network collecting raw signaling data associated with the voice call setup in the 2G or 3G network, the at least one another probe in the 2G or 3G network time-synchronized with the one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the method comprising: (a) correlating the raw signaling data associated with the voice call setup in the LTE network and the raw signaling data associated with the voice call setup in the 2G or 3G network, and determining those data records that are associated with a voice call that is a CS FallBack (CSFB) call; (b) determining when the voice call has succeeded/failed, wherein when the voice call has succeeded, calculating delay components contributed by each signaling delay component, and calculating a total call setup delay of the voice call, and wherein when the voice call has failed, determine a location of failure, and incrementing a call failure KPI; (c) determining when a user terminal returns to the LTE network after the voice call is complete, wherein when the user terminal has not returned to the LTE network after the voice call is complete, incrementing return to LTE failure KPI, and wherein when the user terminal has returned to the LTE network, incrementing return to LTE delay KPI.

In yet another embodiment, the present invention provides a method to determine the Key Performance Indicators associated with a mobile voice call setup of an operator using probes, at least one probe in a Long-Term Evolution (LTE) network collecting raw signaling data associated with the voice call setup in the LTE network, at least another probe in either a 2G or 3G network collecting raw signaling data associated with the voice call setup in the 2G or 3G network, the at least one another probe in the 2G or 3G network time-synchronized with the one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the method comprising: (a) correlating the raw signaling data associated with the voice call setup in the LTE network and the raw signaling data associated with the voice call setup in the 2G or 3G network, and determining those data records that are associated with a voice call which is a CS FallBack (CSFB) call; (b) calculating Key Performance Indicators associated with the CSFB call; (c) storing in a database: (1) data records associated with the CSFB call correlated in (a), and (2) the calculated Key Performance Indicators calculated in (b); and (d) a reporting subsystem to report Key Performance Indicators of the CSFB call according to an operator-specified format.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be to implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for generating CS Fallback Analytics in 4G networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A run-time system for determining Key Performance Indicators associated with a mobile voice call setup of an operator, the system attached to at least one probe in a Long-Term Evolution (LTE) network collecting raw signaling data associated with a voice call setup in the LTE network, the system attached to at least another probe in either a 2G or 3G network collecting raw signaling data associated with a voice call setup in the 2G or 3G network, the at least one another probe in the 2G or 3G network is time-synchronized with the at least one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the system comprising:

a. a correlating subsystem to correlate the raw signaling data associated with the voice call setup in the LTE network and the time-synchronized raw signaling data associated with the same voice call setup in the 2G or 3G network, and determine data records that are associated with the same voice call which is a CS FallBack (CSFB) call in run-time, wherein the data records are based on the raw signaling data associated with the voice call setup in the LTE network and raw signaling data associated with the voice call setup in the 2G or 3G network;

b. a calculating subsystem to calculate Key Performance Indicators associated with the CSFB call;

c. a storing subsystem to store in a database: (1) data records associated with the CSFB call correlated by the correlating subsystem, and (2) the calculated Key Performance Indicators calculated by the calculating subsystem;

d. a reporting subsystem to report Key Performance Indicators of the CSFB call according to an operator-specified format;

wherein the Key Performance Indicators are any of, or a combination of, the following: call setup delay, call failure rate, call success rate, and return to LTE delay; and wherein the call setup delay for both Mobile Originating (MO) and Mobile Terminating (MT) calls comprises delay components contributed by any of, or a combination of, the following: delay from LTE access, delay from radio access change between LTE to 2G or 3G, delay from 2G or 3G core network, and delay from SGs interface in case of mobile terminating calls.

2. The system of claim 1, wherein the call success rate for both Mobile Originating (MO) and Mobile Terminating (MT) calls is determined by subtracting from each 100 calls, a total number of failed calls due to: S1 interface, 2G/3G radio access, or user terminal.

3. The system of claim 1, wherein the mobile voice call is any of, or a combination of, the following: a Mobile Originating (MO) call or a Mobile Terminating (MT) call.

4. The system of claim 1, wherein the raw signaling data associated with the LTE network is collected by any of the following: a probe from eNode-B to MME interface (S1 interface), a probe from MME to SGW interface (S11 interface), or a probe from MME to MSC-VLR interface (SGs interface).

5. The system of claim 4, wherein the raw signaling data comprises any of, or a combination of, the following: an IMSI of a mobile user terminal, a call start time, a call end time, a call direction, eNode-B identity and MME identity.

6. The system of claim 1, wherein the raw signaling data associated with the 2G or 3G network is collected by a probe from RNC (or BSC) to MSC-VLR interface.

7. The system of claim 6, wherein the raw signaling data comprises any of, or a combination of, the following: an IMSI of mobile terminal, a call start time, a call end time, a call direction, RNC identity, BSC identity and MSC-VLR identity.

8. The system of claim 1, wherein the system is any of the following: the system being separate from any probes, the system integrated with at least one probe, or the system being integrated with one or more probes.

9. The system of claim 1, wherein the reporting subsystem provides reports: for different time intervals, for different network components, for different user terminal types, or for different groups of users.

10. The system of claim 9, wherein the network components are any of the following: MME, eNode B, MSC-VLR, RNC or BSC.

11. A method to determine the Key Performance Indicators associated with a mobile voice call setup of an operator using probes, at least one probe in a Long-Term Evolution (LTE) network collecting raw signaling data associated with a voice call setup in the LTE network, at least another probe in either a 2G or 3G network collecting raw signaling data associated with a voice call setup in the 2G or 3G network, the at least one another probe in the 2G or 3G network is time-synchronized with the at least one probe in the LTE network, wherein the LTE network not having networking capabilities to complete the mobile voice call setup, but the 2G or 3G network having capabilities to complete the mobile voice call setup, with Circuit Switched (CS) Fallback procedures being implemented for call handover from the LTE to the 2G or 3G network for call completion, the method comprising:

a. correlating in run-time the raw signaling data associated with the voice call setup in the LTE network and the time-synchronized raw signaling data associated with the voice call setup for the same voice call in the 2G or 3G network, and determine data records that are associated with the same voice call which is a CS FallBack (CSFB) call in run-time, wherein the data records are based on the raw signaling data associated with the voice call setup in the LTE network and raw signaling data associated with the voice call setup in the 2G or 3G network;

b. calculating Key Performance Indicators associated with the CSFB call;

c. storing in a database: (1) data records associated with the CSFB call correlated in (a), and (2) the calculated Key Performance Indicators calculated in (b);

d. a reporting subsystem to report Key Performance Indicators of the CSFB call according to an operator-specified format;

wherein the Key Performance Indicators are any of, or a combination of, the following: call setup delay, call failure rate, call success rate, and return to LTE delay; and wherein the call setup delay for both Mobile Originating (MO) and Mobile Terminating (MT) calls comprises delay components contributed by any of, or a combination of, the following: delay from LTE access, delay from radio access change between LTE to 2G or 3G, delay from 2G or 3G core network, and delay from SGs interface in case of mobile terminating calls.

12. The method of claim 11, wherein the call success rate for both Mobile Originating (MO) and Mobile Terminating (MT) calls is determined by subtracting from each 100 calls, a total number of failed calls due to: S1 interface, 2G/3G radio access, or user terminal.

13. The method of claim 11, wherein the raw signaling data associated with the LTE network is collected by any of the following: a probe from eNode-B to MME interface (S1 interface), a probe from MME to SGW interface (S11 interface), or a probe from MME to MSC-VLR interface (SGs interface), and wherein the raw signaling data comprises any of, or a combination of, the following: an IMSI of a mobile user terminal, a call start time, a call end time, a call direction, eNode-B Id, and MME Id.

14. The method of claim 11, wherein the raw signaling data associated with the 2G or 3G network is collected by a probe from RNC (or BSC) to MSC-VLR interface, and wherein the raw signaling data comprises any of, or a combination of, the following: an IMSI of mobile terminal, a call start time, a call end time, a call direction, RNC identity, BSC identity, and MSC-VLR identity.

15. The system of claim 11, wherein the reporting subsystem provides reports: for different time intervals, for different user terminal types, for different groups of users, or for any of the following network components: MME, eNode B, MSC-VLR, RNC or BSC.

* * * * *